United States Patent [19]

Shimizu et al.

[11] Patent Number: 4,869,651
[45] Date of Patent: Sep. 26, 1989

[54] WOBBLE PLATE TYPE COMPRESSOR

[75] Inventors: Shigemi Shimizu, Sakai; Hidehiko Shimizu, Gunma; Kiyoshi Terauchi, Isesaki, all of Japan

[73] Assignee: Sanden Corporation, Gunma, Japan

[21] Appl. No.: 221,610

[22] Filed: Jul. 20, 1988

[30] Foreign Application Priority Data

Jul. 20, 1987 [JP] Japan .............................. 62-110011[U]

[51] Int. Cl.$^4$ ................................................ F04B 1/14
[52] U.S. Cl. .............................. 417/269; 29/149.5 R; 29/522.1; 384/622
[58] Field of Search ................ 417/269, 270; 384/622, 384/621, 620, 618; 29/149.5 R, 149.5 C, 522.1, 524.1

[56] References Cited

U.S. PATENT DOCUMENTS

| | | |
|---|---|---|
| Re. 27,844 | 12/1973 | Olson, Jr. . |
| 926,966 | 7/1909 | Shirley . |
| 1,380,622 | 6/1921 | Winn . |
| 2,845,311 | 4/1954 | Cobb . |
| 3,552,886 | 11/1968 | Olson, Jr. . |
| 3,838,942 | 10/1974 | Pokorny . |
| 3,945,765 | 3/1976 | Toyoda et al. . |
| 4,042,309 | 8/1977 | Hiraga . |
| 4,073,603 | 2/1978 | Abendschein et al. . |
| 4,095,921 | 6/1978 | Hiraga et al. ........................ 417/269 |
| 4,125,298 | 11/1978 | Heurich et al. ...................... 29/522.1 |
| 4,221,545 | 9/1980 | Terauchi . |
| 4,301,716 | 11/1981 | Saegusa et al. . |
| 4,480,964 | 11/1984 | Skinner . |
| 4,574,448 | 3/1986 | Brandenstein ....................... 29/522.1 |

Primary Examiner—Leonard E. Smith
Attorney, Agent, or Firm—Banner, Birch, McKie & Beckett

[57] ABSTRACT

A refrigerant wobble plate type compressor is disclosed which includes pistons for being reciprocated within respective cylinders by a wobble plate member. The wobble plate member is adjacently disposed and relatively rotatably borne on an inclining surface of an inclined rotor member. The inclined rotor member is secured on an inner end of a drive shaft. First and second end plates are mounted on one end and an opposite end of a compressor housing respectively. The first end plate comprises inlet and outlet ports, and defines discharge and suction chambers. The drive shaft is rotatably borne in the second end plate and extends from the exterior to the interior of the compressor housing. A first anti-friction thrust bearing assembly is mounted between an inner end surface of the second end plate and an opposite end of the inclining surface of the inclined rotor member. A second anti-friction thrust bearing assembly is mounted between the inclining surface of the inclined rotor member and the end surface of the wobble plate member facing the inclining surface of the inclined rotor member. The second anti-friction thrust bearing assembly comprises first and second annular race members and an annular rolling element cage assembly. The first annular race member is fixedly disposed on the end surface of the wobble plate member, and the second annular race member is disposed on the inclining surface of the inclined rotor member.

12 Claims, 4 Drawing Sheets

WOBBLE PLATE TYPE COMPRESSOR

TECHNICAL FIELD

This invention relates to a refrigerant compressor, and more particularly, to a wobble plate type refrigerant compressor in which pistons are reciprocated by a wobble plate driven by a rotor which is secured on a drive shaft.

BACKGROUND OF THE INVENTION

In a wobble plate type compressor of the kind described in U.S. Pat. No. 4,042,309, the rotor is wedge-shaped and is sandwiched between the wobble plate and a front plate of the compressor which rotatably supports the drive shaft. The wobble plate compressor is small in volume and is suitable for automotive air conditioning systems.

The compressor shown in the above-identified U.S. patent is provided with two anti-friction thrust bearing assemblies having a pair of annular race members and a rolling element cage assembly sandwiched between the annular race members. One of the thrust bearing assemblies is disposed between the front end plate of the compressor housing and the rotor to take up thrust load on the rotor, and the other bearing assembly is disposed between the rotor and the wobble plate. As a result, frictionless driving of the wobble plate is provided.

A plurality of radial projections are formed on the surface of the annular race members and are received in a plurality of depressions formed in the front end plate, the rotor and the wobble plate, which limit the radial movement of the annular race members. When thus positioned, a small radial gap exists between each annular race member and each depression so that appropriate play is provided between the race member and the supporting structure, i.e., the rotor, wobble plate and front end plate.

Typically in a wobble plate type compressor, a rotation-preventing mechanism for converting the rotating motion of the rotor to wobbling motion of the wobble plate is provided in the form of an angular motion converting mechanism. However, it is difficult with these kinds of motion converting mechanisms to obtain an angular motion conversion with perfectly regular angular velocity. Thus, when the drive shaft rotates at high speeds, a fluctuating torque occurs which tends to cause radial vibration of the wobble plate. This fluctuating torque is increased by the fluctuating torque which results from compressing refrigerant gas. When the fluctuating torque exceeds a certain value, the wobble plate begins a radial vibration, the amplitude of which is determined by the amount of play in the rotation-preventing mechanism.

In the above-mentioned compressor (shown in U.S. Pat. No. 4,042,309), the annular race member disposed on the wobble plate will also begin to vibrate radially with the radial vibration of the wobble plate. As a result, and because only a small radial gap will normally exist between the annular race member and the wobble plate, the radial projections formed in the annular race member collide with the depressions formed in the wobble plate. Thus, after several hours of operation, the radial projection of the annular race member, which is made of steel, may thrust through a side wall of the depression of the wobble plate, which is made of aluminum alloy, or the radial projection may be broken, causing serious damage to the wobble plate and bearing assembly. In addition, the noise that results from the collision between the radial projection and the depression is not negligible.

These problems become more noticable depending upon the extent to which the rotation-preventing mechanism achieves angular motion conversion with irregular angular velocity. In this regard, use of a rotation-preventing mechanism which includes a guide rail element disposed in the compressor housing and a slider element slidably disposed onto the guide rail element (such as shown in U.S. Pat. No. 3,552,886) will result in more irregular angular velocity than a rotation-preventing mechanism which includes a pair of intermeshing gear-like elements (also shown in U.S. Pat. No. 3,552,886). Yet, the former rotation-preventing mechanism is necessary for a wobble plate type variable displacement compressor of the type shown in U.S. Pat. No. 4,073,603. For this reason, solving the above-mentioned problems becomes particularly important.

SUMMARY OF THE INVENTION

It is a primary object of this invention to provide a wobble plate type compressor with an improved arrangement of the anti-friction thrust bearing assembly between the rotor member and the wobble plate member which prevents damage to the bearing assembly and wobble plate, and which also prevents noise caused by the rotating motion of the race member.

According to this invention, a refrigerant wobble plate type compressor includes pistons which are reciprocated within respective cylinders by a wobble plate member. The wobble plate member is adjacently disposed and relatively rotatably borne on an inclining surface of an inclined rotor member. The inclined rotor member is secured on an inner end of a drive shaft. First and second end plates are mounted on one end and an opposite end of a compressor housing respectively. The first end plate comprises inlet and outlet ports, and defines discharge and suction chambers. The drive shaft is rotatably borne in the second end plate and extends from the exterior to the interior of the compressor housing. A first anti-friction thrust bearing assembly is mounted between an inner end surface of the second end plate and an opposite end of the inclining surface of the inclined rotor member. A second anti-friction thrust bearing assembly is mounted between the inclining surface of the inclined rotor member and an end surface of the wobble plate member facing the inclining surface of the inclined rotor member. The second anti-friction thrust bearing assembly comprises first and second annular race members and an annular rolling element cage assembly. The first annular race member is fixedly disposed on the end surface of the wobble plate member, and the second annular race member is disposed on the inclining surface of the inclined rotor member.

DETAILED DESCRIPTION OF THE PREFERRED EMBODIMENT

Figure 1:
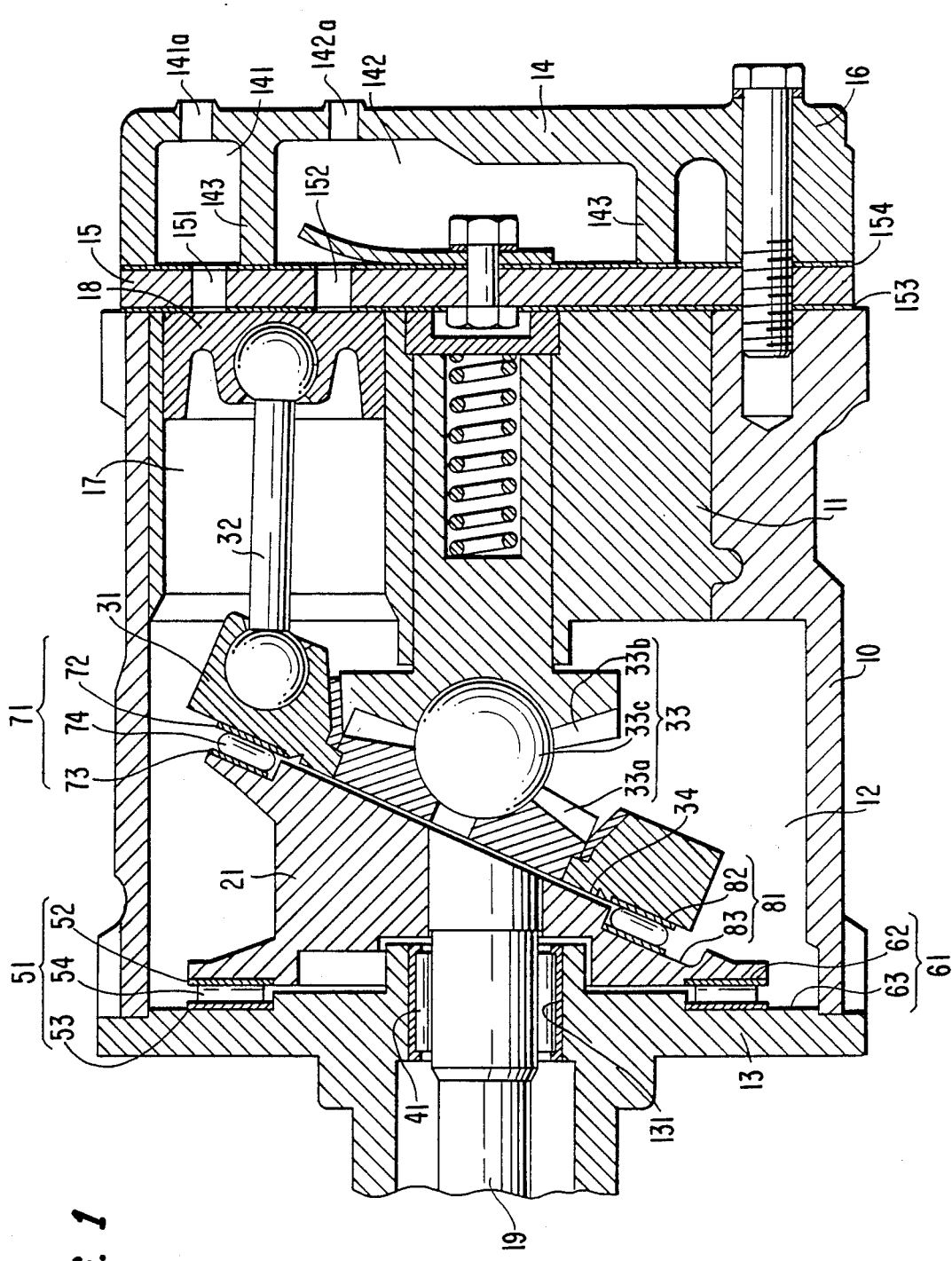
FIG. 1 is a vertical longitudinal sectional view of a wobble plate type compressor in accordance with one embodiment of this invention.
Figure 2:
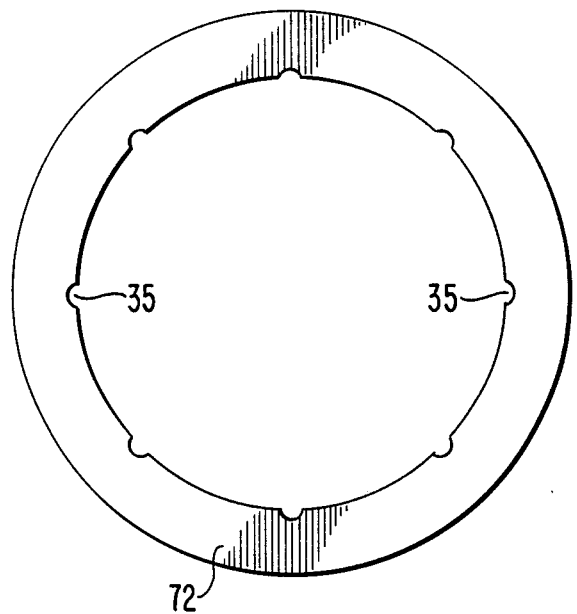
FIG. 2 is a plan view of the first annular race member of the second anti-friction thrust bearing assembly.
Figure 3:
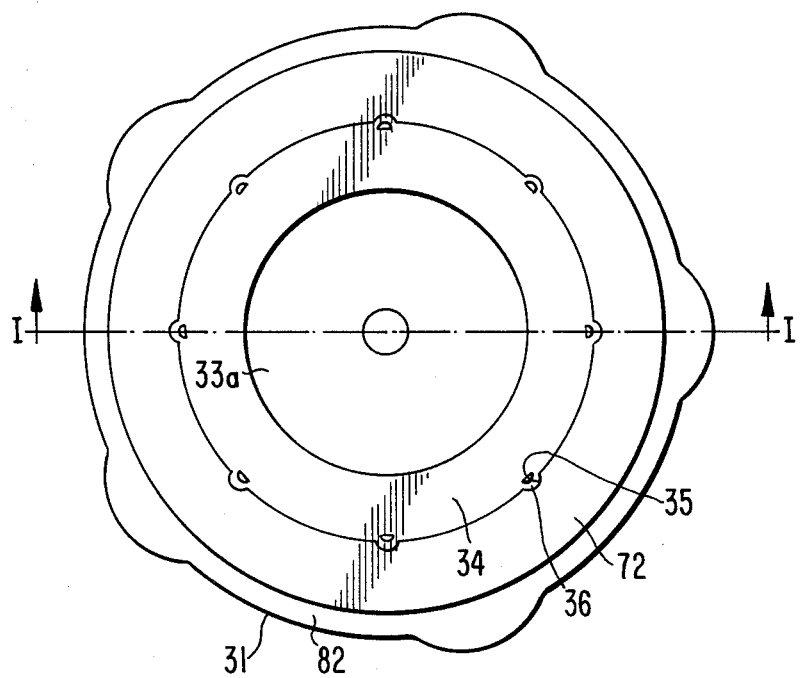
FIG. 3 is a plan view of the first annular race member shown in FIG. 2 secured to one end surface of the wobble plate by caulking.
Figure 4:
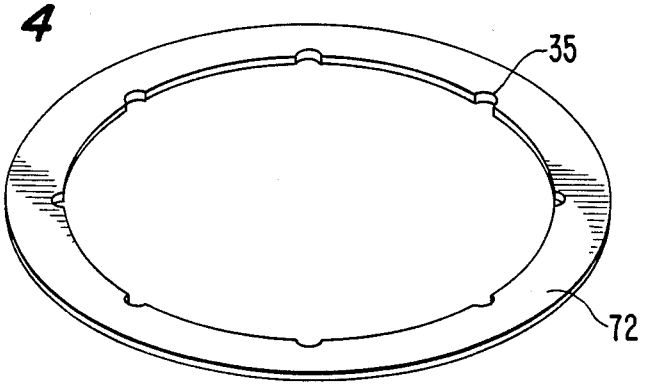
FIG. 4 is a perspective illustration of the first annular race member shown in FIG. 2.
Figure 5:
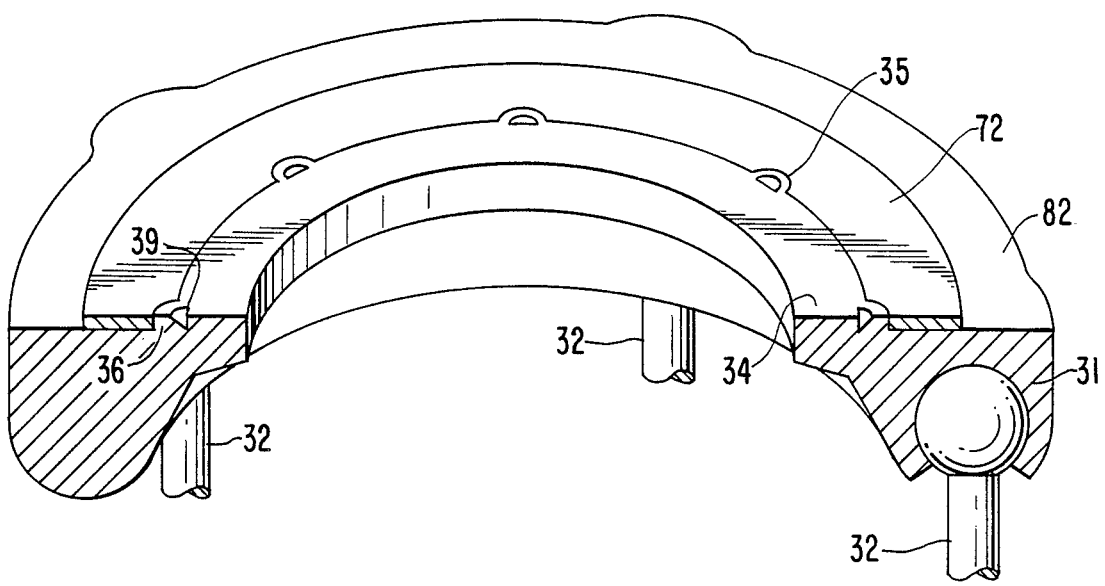
FIG. 5 is a perspective illustration taken along line I—I of FIG. 3 in which the intermeshing gear-like elements are omitted.
Figure 6:
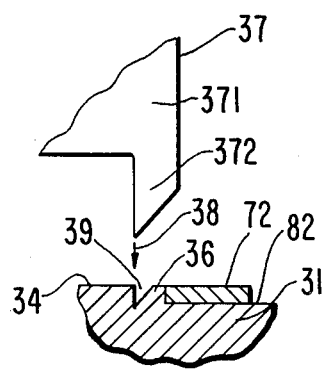
FIG. 6 is a partial sectional view illustrating the caulking process for securing the first annular race member to the end surface of the wobble plate.

Referring to FIG. 1, a refrigerant compressor comprises a housing 10 having a cylinder block 11 at one end thereof and a hollow portion 12 at the other end. Hollow portion 12 mounts a front end plate 13 by means of screws (not shown). Cylinder block 11 mounts a rear end plate 14 and a valve plate 15 by means of bolts 16.

Cylinder block 11 is formed with a plurality of cylinders 17, in which pistons 18 are slidably positioned.

A wedge-shaped rotor 21 and a wobble plate 31 are disposed within hollow portion 12. Wedge-shaped rotor 21 is secured on a drive shaft 19 which is borne by a journal bearing 41 disposed within a center opening 131 of front end plate 13. Thus, wedge-shaped rotor 21 is rotated by rotation of drive shaft 19.

Wobble plate 31 is connected with pistons 18 by connecting rods 32 and is adjacently disposed on an inclining surface of wedgeshaped rotor 21. A rotation-preventing mechanism 32, comprising a pair of intermeshing gear-like elements 33a, 33b and a ball element 33c, maintains wobbling motion of wobble plate 31. Thus, pistons 18 are reciprocated within cylinders 17 by the rotation of drive shaft 19.

A suction chamber 141 and a discharge chamber 142 are defined by a partition wall 143 axially projected from an inner surface of rear end plate 14. An inlet port 141a communicating between suction chamber 141 and an external fluid circuit (not shown) and an outlet port 142a communicating between discharge chamber 142 and the external circuit are formed in rear end plate 14.

Valve plate 15 is provided with a plurality of valved suction ports 151 connected between suction chamber 141 and respective cylinders 17, and a plurality of valved discharge ports 152 connected between discharge chamber 142 and respective cylinders 17. Suitable reed valves for suction port 151 and discharge port 152 are described in U.S. Pat. No. 4,011,029 issued to Shimizu. Gaskets 153 and 154 are placed between cylinder block 11 and an inner surface of valve plate 15, and between an outer surface of valve plate 15 and rear end plate 14, respectively, to seal the mating surfaces of valve plate 15 and cylinder block 11 and rear end plate 14.

A first anti-friction thrust bearing assembly 51 is mounted within a first annular space 61 which is defined by a first annular recess 62 formed in one end of the inclining surface of wedge-shaped rotor 21, and a second annular recess 63 formed in an inner surface of front end plate 13. First anti-friction thrust bearing assembly 51 comprises first and second annular race members 52, 53 which are disposed within first and second annular recesses 62, 63 respectively, and an annular needle roller cage assembly 54 sandwiched between first and second annular race members 52, 53.

A second anti-friction thrust bearing assembly 71 is mounted within a second annular space 81 which is defined by a third annular recess 82 formed in an end surface of wobble plate 31 facing the inclining surface of wedge-shaped rotor 21, and a fourth annular recess 83 formed in the inclining surface of wedge-shaped rotor 21. Second anti-formed thrust bearing assembly 71 comprises third and fourth annular race members 72, 73 disposed within third and fourth annular recesses 82, 83 respectively and an annular needle roller cage assembly 74 sandwiched between third and fourth annular race members 72, 73.

Referring to FIGS. 2–6, the structure of third annular race member 72 of second anti-friction thrust bearing assembly 71 and the method of fixedly securing the race member to the end surface of wobble plate 31 are shown.

As shown in the figures, a method for fixedly securing annular race member 72 to the end surface of wobble plate 31 comprises the following steps:

Step 1: Forming an annular recess 82, having an inner diameter slightly smaller than the inner diameter of annular race member 72, in the end surface of wobble plate 31 facing the inclining surface of wedge-shaped rotor 21. An annular convex portion 34, having an outer diameter slightly smaller than the inner diameter of annular race member 72, will also be formed in the surface of wobble plate 31 as a result of forming recess 82.

Step 2: Forming a plurality of semi-circular cut-out portions 35 located along the inner peripheral surface of annular race member 72 at radially regular intervals.

Step 3: Disposing annular race member 72 on annular recess 82.

Step 4: Simultaneously forming a plurality of radial projections 36, located adjacent semi-circular cut-out portions 35, in annular convex portion 34.

In step 4, a tool 37 for caulking comprises an annular ring member 371 and a plurality of blade members 372 which axially project from annular ring member 371 at radially regular intervals. Caulking tool 37 is controlled to move in the direction of an arrow 38, shown in FIG. 6, and thrusts into annular convex portion 34 to form radial projections 36, each of which firmly engages an adjacent semi-circular cut-off portion 35. As a result, annular race member 72 is firmly secured to the end surface of wobble plate 31. Indents 39 are also formed in annular convex portion 34 as a result of forming radial projections 36.

By thus securing annular race member 72 to the wobble plate, the problems associated with radial vibration of annular race member 72, described above, are prevented.

Figure 7:
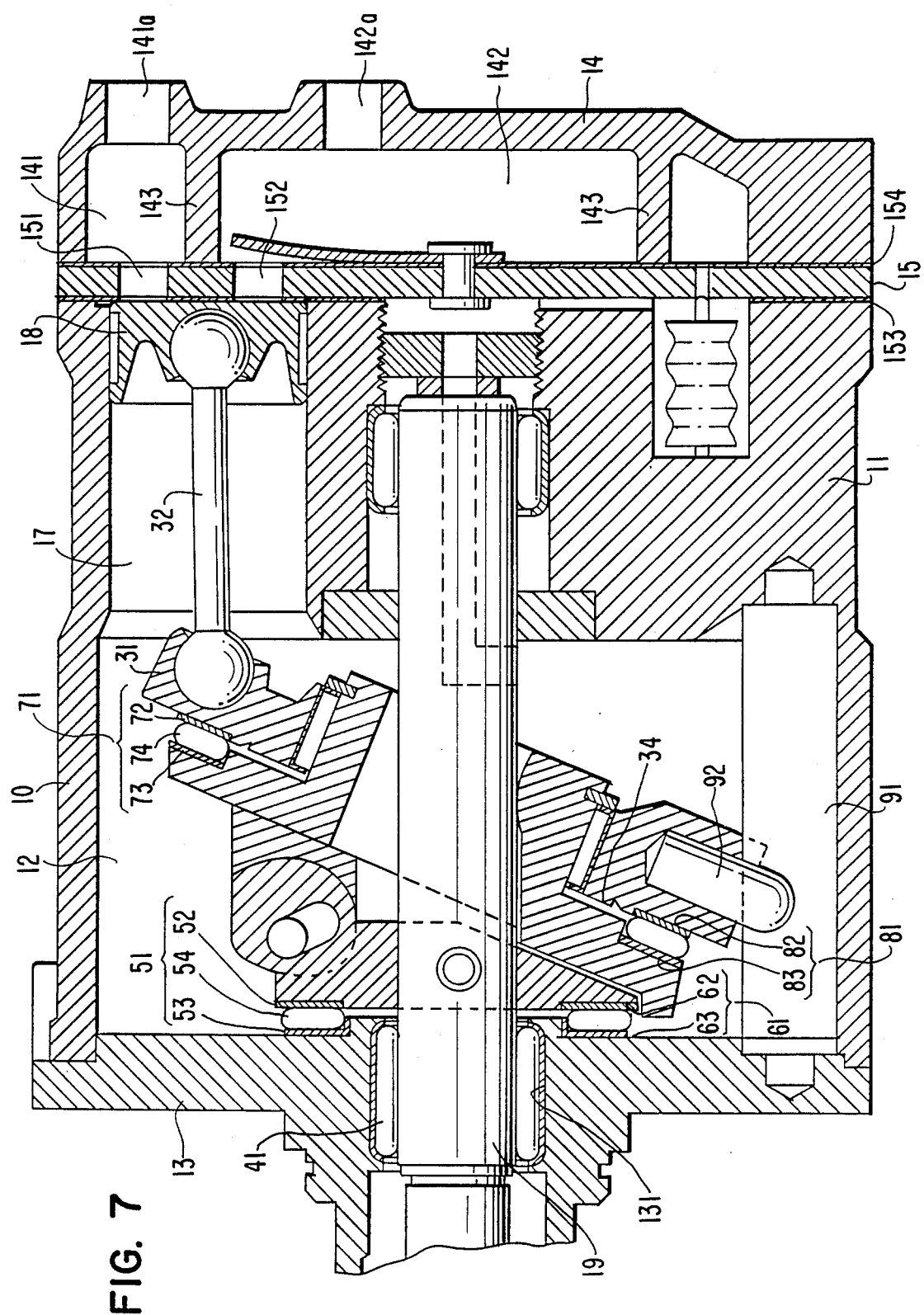
FIG. 7 is a vertical longitudinal sectional view of a variable displacement wobble plate type compressor in accordance with another embodiment of this invention.

Referring to FIG. 7, another embodiment of this invention is shown. In this embodiment, the present securing structure is applied to a variable displacement wobble plate type compressor which includes a rotation-preventing mechanism comprising a guide rail element 91 disposed in a housing 10 and a slider element 92 slidably disposed onto guide rail element 91.

Though in the described embodiments, the securing structure is located along the inner peripheral surface of annular race member 72, it should be understood that the securing structure can also be adapted for the outer peripheral surface of the annular race member. It is also possible to provide similar securing structure for annular race members 73, 52, and 53.

This invention has been described in detail in connection with the preferred embodiments. These embodiments, however, are merely for example only and the invention is not restricted thereto. It will be easily understood by those skilled in the art that other variations and modifications can easily be made within the scope of this invention as defined by the appended claims.

We claim:

1. A refrigerant compressor in which pistons are reciprocated within respective cylinders by a wobble plate member driven by an inclined rotor member secured on an inner end of a drive shaft, said wobble plate member being adjacently disposed and relatively rotatably borne on an inclining surface of said rotor member, an anti-friction thrust bearing assembly being mounted between said inclining surface of said inclined rotor member and an end surface of said wobble plate member facing said inclining surface of said inclined rotor member, said anti-friction thrust bearing assembly comprising first and second annular race members and an annular rolling element cage assembly, said first annular race member being disposed on said end surface of said wobble plate member, and said second annular race member being disposed on said inclining surface of said inclined rotor member, the improvement comprising:

securing means for fixedly disposing said first annular race on said end surface of said wobble plate member, said securing means including:

an annular recess formed in said end surface of said wobble plate member for receiving said first annular race member;

a plurality of cut-out portions formed in the peripheral surface of said annular race member; and a plurality of radial projections formed in said end surface of said wobble plate member, each of said radial projections being positioned adjacent to, and engaging, one of said plurality of cut-out portions to thus firmly secure said annular race member to said wobble plate member.

2. The securing means of claim 1 wherein said cut-out portions are positioned along the inner peripheral surface of said annular race member.

3. The securing means of claim 1 wherein the configuration of each of said cut-out portions is semi-circular.

4. The securing means of claim 1 wherein at least three cut-out portions are positioned along the peripheral surface of said annular race member.

5. The securing means of claim 1 wherein said cut-out portions are positioned at radially regular intervals along the peripheral surface of said annular race member.

6. A method for fixedly disposing an annular race member of an anti-friction thrust bearing assembly on an end surface of a wobble plate member of a refrigerant compressor comprising the steps of:

forming a plurality of cut-out portions in the peripheral surface of said annular race member;

disposing said annular race member on said end surface of said wobble plate member; and securing said cut-out portions to said end surface of said wobble plate member.

7. The method of claim 6 wherein said cut-out portions are formed in the inner peripheral surface of said annular race member.

8. The method of claim 6 wherein each of said cut-out portions is formed in a semi-circular configuration.

9. The method of claim 6 wherein at least three cut-out portions are formed in the peripheral surface of said annular race member.

10. The method of claim 9 wherein said cut-out portions are formed at radially regular intervals.

11. The method of claim 6 further comprising the step of forming an annular recess in said end surface of said wobble plate member for receiving said annular race member.

12. The method of claim 6 wherein said cut-out portions are secured to said end surface of said wobble plate member by caulking.

* * * * *